United States Patent
Frohne et al.

(10) Patent No.: US 11,515,697 B2
(45) Date of Patent: Nov. 29, 2022

(54) SEALING END FOR HIGH-VOLTAGE CABLES

(71) Applicant: NEXANS, Courbevoie (FR)

(72) Inventors: Christian Frohne, Hannover (DE); Pierre Mirebeau, Villebon sur Yvette (FR); Nicolas Lallouet, Baincthun (FR); Quentin Eyssautier, Calais (FR); Abdellatif Ait Amar, Marck (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/188,033

(22) Filed: Mar. 1, 2021

(65) Prior Publication Data
US 2022/0224099 A1    Jul. 14, 2022

(30) Foreign Application Priority Data
Mar. 5, 2020 (EP) .................................... 20305235

(51) Int. Cl.
*H02G 15/23* (2006.01)
*H02G 1/14* (2006.01)

(52) U.S. Cl.
CPC .............. *H02G 15/23* (2013.01); *H02G 1/14* (2013.01)

(58) Field of Classification Search
CPC ................................ H02G 15/23; H02G 1/14
USPC ......................................................... 174/20
See application file for complete search history.

(56) References Cited

U.S. PATENT DOCUMENTS

| | | | | |
|---|---|---|---|---|
| 1,923,147 A * | 8/1933 | Hirshfeld | ............... | H02G 15/26 174/12 R |
| 2,615,952 A * | 10/1952 | Rifenburg | ............... | H02G 15/26 285/302 |
| 2,713,081 A * | 7/1955 | Merrell | ............... | H02G 15/22 174/14 R |
| 2,861,119 A * | 11/1958 | Collonge | ............... | H02G 5/10 174/20 |
| 3,716,652 A * | 2/1973 | Lusk | ............... | H02G 15/22 174/15.3 |
| 3,758,699 A | 9/1973 | Lusk | | |
| 4,280,014 A | 7/1981 | Papadopulos | | |
| 6,115,937 A * | 9/2000 | Griffioen | ............... | H02G 15/26 34/106 |
| 9,253,821 B2 * | 2/2016 | Bremnes | ............... | E21B 36/04 |
| 10,151,521 B2 * | 12/2018 | Schippl | ............... | H01B 12/16 |

FOREIGN PATENT DOCUMENTS

JP    H09 213147    8/1997

OTHER PUBLICATIONS

International Search Report dated Aug. 4, 2020.

\* cited by examiner

*Primary Examiner* — Timothy J Thompson
*Assistant Examiner* — Michael F McAllister
(74) *Attorney, Agent, or Firm* — Sofer & Haroun, LLP

(57) ABSTRACT

A high-voltage cable sealing end (100) has a primary volume (102) and a secondary volume (104) fluidically connected thereto, which are filled with an insulating fluid. The primary volume (102) and the secondary volume (104) are sealed with respect to the atmosphere surrounding the high-voltage cable sealing end (100). The secondary volume (104) can be disconnected from the primary volume (102) via a separable connection (106) which can be cut off in a fluid-tight manner. A drying agent, which draws moisture out of the insulating fluid, is introduced into the secondary volume (104).

10 Claims, 2 Drawing Sheets

SEALING END FOR HIGH-VOLTAGE CABLES

RELATED APPLICATION

This application claims the benefit of priority from European Patent Application No. 20 305 235.2, filed on Mar. 5, 2020, the entirety of which is incorporated by reference.

FIELD

The invention relates to a sealing end for high-voltage cables.

BACKGROUND

A reliable electric energy supply is essential for many areas of private and economic life. In this case, the distribution of electric energy in power supply systems takes place via buried cables and overhead lines, which conduct electric voltages in different voltage ranges, usually roughly categorized as low voltage, medium voltage and high voltage. Voltage conversion between the voltage ranges takes place by means of transformers. The power supply system is divided into different areas. Each area or sector is connected to other areas or sectors at one or more points. In the event of faults in one area or sector, for example in the event of short circuits, the sector can be disconnected from the other areas at the connecting points so that any impairment of the power supply can be restricted locally.

The sectors or areas are switchably connected to one another via high-voltage switching stations. In many high-voltage switching stations, the electric energy is conducted to the switching elements via cables. High-voltage cables can be present as oil-filled cables or plastic-insulated cables.

Oil-filled cables are a special design of high-voltage cable and are pressurized with low viscosity mineral oil in their interior during operation. The oil primarily has the task of compensating inhomogeneities in the electrical insulation between the internal conductor and the metal outer shield. The insulation can be designed in the form of oil-saturated paper, for example. Without this compensation, the irregular design of the paper layers in combination with small pockets of dirt or air would result in excessive increases in the electric field strength with partial discharges and subsequent breakdowns, which would destroy the insulation and therefore make the cable unusable.

In addition to the corresponding electrical devices, pressure regulating devices for the oil, which ensure a constant oil pressure over the entire section of the cable interior, are located at one or both ends of oil-filled cables. In the event of a drop in pressure, for example as a result of cable damage, the line has to be switched off immediately. There are two primary types of oil-filled cable:

Low-pressure oil-filled cables are conventionally provided with paper insulation, which is saturated with low viscosity oil during manufacture. These cables, as single- or multi-conductor cables, can be equipped with an outer lead or aluminium jacket, a pressure sheath and a protective sheath against mechanical impacts. At the cable end points, the low viscosity oil is fed into the interior of the cable from pressure compensation containers at a pressure of 0.5 to 3.5 bar in order to thereby keep the oil pressure in the interior of the cable within the permissible limits over the full ambient and operating temperature range. To this end, in the case of single-core cables, the conductor can have a hollow design whilst, in the case of two- or three-core cables, the interstices between the cores can serve as an oil channel.

High-pressure oil-filled cables can likewise be designed with paper insulation saturated with a very low viscosity oil; indeed, for a three-phase alternating current, three conductors having the insulation and an outer electrical shield are arranged together in a steel tube. After being buried in the ground, this steel tube is kept under an oil pressure of approximately 15 bar from the cable ends.

Plastic-insulated cables generally have an insulation of the inner conductor made of cross-linked polyethylene, which is homogeneously applied to the inner conductor under cleanroom conditions. Other plastics used for high-voltage cables include, amongst others, PVC, ethylene-propylene polymers or silicone rubber. It is also highly important in plastic-insulated cables to design the insulation without pockets of air, foreign particles or impurities, which cause an irregular field strength characteristic and can subsequently lead to a failure of the insulation.

Particular attention must be paid to the field strength characteristic on and in the insulating material at the ends of high-voltage cables. At the point where the outer shield of the cable ends, an increase in the field strength occurs which can be greater than the breakdown strength of air or even the insulating material. To keep the field strength at the cable ends at reliable levels in a controlled manner, special cable sealing ends are used, which, hereinafter, are also referred to as sealing ends for short.

Sealing ends are predominantly used to terminate high-voltage cables, for example at transitions from a high-voltage cable to another line type, for example an overhead line, or at a transition from a cable to another structural or system component, for example from the high-voltage cable to a transformer or disconnector.

Sealing ends for high-voltage cables are conventionally filled with an insulating liquid, which must have a good electric strength under all operating conditions. Together with a corresponding geometric configuration of the sealing end, the insulating fluid, in a controlled manner, converts the high electric field strengths of the cable and the field control elements which are arranged in the sealing end into lower field strengths which are admissible in the sealing end and its environment.

Oils and gases, for example, are used as insulating fluids. A gas which is frequently used in high-voltage technology is sulphur hexafluoride, often also denoted by the chemical formula SF6. The breakdown strength of SF6 is almost three times higher under normal pressure than in air or nitrogen. These properties along with the low dielectric losses predestine it for use as an insulating gas in coaxial cables and gas-insulated high-frequency power capacitors, which can therefore be built on a smaller scale. As an insulating gas in electric switching stations, it is generally kept under an increased pressure of 5 bar to 10 bar in order to ensure the necessary high insulating capacity. The increased gas pressure reduces the mean path of the free electrons in the gas. As a result, electrons cannot be accelerated as greatly as under normal pressure, since they collide earlier with the SF6 molecules. The probability of the electrons producing charged ions is thus reduced.

The properties of the insulating fluid must preferably remain the same during the operating life of the sealing end and at the level at the time of commissioning. The penetration of moisture, for example through diffusion, into the interior of the sealing end cannot be ruled out completely. For example, during the assembly of the sealing end, the interior thereof is at least in temporary contact with the surrounding atmosphere, so that, during the first filling of the sealing end, moisture from the humid ambient air can find its way into the insulating fluid.

At the present time, the sealing end is hermetically sealed after the introduction of the insulating fluid and the insulating fluid remains permanently in the sealing end.

Tests have shown that, despite all measures, the moisture content in the insulating fluid increases over time. This can be due to the fact that the cable ends and sealing ends are often in the open. However, even in the case of cable ends and sealing ends which are enclosed by housings or are located in buildings, there is still the risk that moisture from the ambient air will diffuse into the system through the cable insulation or sealing elements. Moreover, moisture from polymer materials of the sealing end or in components accommodated in the sealing end can release gas. The moisture is absorbed by the insulating fluid and, in particular, impairs the dielectric properties thereof, so that the insulating capacity is reduced and the field-controlling properties are altered, which, above a certain moisture content, can lead to an undefined and uncontrolled increase in the field strength in the sealing end, to the breakdown of the insulating fluid and possibly to the failure of the insulation.

In switching stations using the fundamentally non-toxic SF6, in addition to the non-toxic tetrafluoromethane, electric arcs during switching in combination with contaminants such as a slight water content, for example, result in toxic fluoride compounds such as hydrogen fluoride and thionyl fluoride and the highly toxic disulfur decafluoride during operation. It is also desirable to prevent moisture in the insulating fluid for this reason.

However, nowadays, drying of the insulating fluid or the interior of the sealing end, i.e. the removal of moisture, only takes place during the installation or first filling of the sealing end.

Taking this as a starting point, the object of the present invention is to provide a sealing end for a high-voltage cable, which overcomes one or more of the problems mentioned at the outset or at least delays their occurrence and reduces their effects.

SUMMARY OF THE INVENTION

To achieve this object, the invention, according to a first aspect, proposes a high-voltage cable sealing end having a primary volume and a secondary volume, which are filled with an insulating fluid, for example an insulating gas or an insulating oil. The primary volume and the secondary volume are sealed with respect to the atmosphere surrounding the high-voltage cable sealing end. The primary volume can moreover be disconnected from the secondary volume via a separable connection which can be cut off in a fluid-tight manner. A drying agent, which draws moisture out of the insulating fluid, is introduced into the secondary volume. Drying can take place by way of adsorption, for example, such as in molecular sieving, for instance, or by way of suitable getter materials.

During operation, the two volumes are fluidically connected to one another and the insulating fluid can move between the volumes. The movement can take place by way of thermal circulation or by way of a circulation promoted by means of a mechanical drive, so that moisture which is contained in the insulating fluid or which penetrates therein reaches the drying agent along with the insulating fluid, where it is drawn out of the insulating fluid. Through its diffusion, the moisture contained in the fluid also reaches, and comes into contact with, the drying agent, which draws the moisture out of the fluid.

The option of disconnecting the secondary volume from the primary volume and thereby keeping the primary volume sealed-off, enables simpler handling during the initial assembly or when changing the drying agent, On the one hand, only a small volume of insulating fluid compared to the primary volume has to be handled at the assembly site since the primary volume can already be filled, or can remain filled, with the insulating fluid. On the other hand, in the worst-case scenario, only the insulating fluid contained in the comparatively small secondary volume can escape. Moreover, the pressure of the insulating fluid in the primary volume is also maintained when the connection is disconnected.

In one configuration of the high-voltage cable sealing end, the separable connection which can be cut off in a fluid-tight manner comprises a first cut-off valve for the primary volume and a disconnection point for the secondary volume. The primary volume can be closed via the cut-off valve before the secondary volume is disconnected from the primary volume at the disconnection point. In this configuration, it is, for example, possible to change the drying agent incorporated in the secondary volume, for example because its function has diminished or become impaired through saturation, without enabling the insulating fluid located in the primary volume to flow out during the disconnection of the two volumes. Any impairment or diminishment of the function of the drying agent can be detected by corresponding sensors in the secondary volume or primary volume. Drying agents are also known which change colour when they become increasingly saturated with moisture. In these cases, a viewing window can be provided in the secondary volume, for example, which enables visual monitoring of the drying agent arranged therein. If it is detected that the saturation of the drying agent has exceeded the admissible level, a change of drying agent can be scheduled, for example during an already imminent shut-down or service.

In one configuration of the high-voltage cable sealing end, the separable connection which can be cut off in a fluid-tight manner comprises a second cut-off valve between the disconnection point and the secondary volume. In this configuration, it is also possible to seal off the secondary volume with respect to the environment in the state in which it is disconnected from the primary volume, in order to thereby achieve simpler handling, for example, or to connect a pre-filled secondary volume to the primary volume. If a pre-filled secondary volume is connected to the primary volume, only a small quantity of air and moisture contained therein, if any, can find its way into the closed system from the surrounding atmosphere, which means that the quantity of moisture penetrating into the system in this way is reduced. Moreover, during the disconnection of the primary and secondary volumes, only very little insulating fluid can escape and find its way into the environment. As in the other configurations, changing the secondary volume or the drying agent contained therein is also easily possible in this configuration.

The configurations described above can additionally comprise a line which is arranged outside the first cut-off valve in a connecting volume formed by the connection between the primary volume and the secondary volume, and which can be cut off in a fluid-tight manner. This line can be used to evacuate and/or fill at least the connecting volume, for example with the insulating fluid. When a second cut-off valve is provided, the secondary volume can also be evacuated and/or filled via the line The option of filling or evacuating the secondary volume and possibly the connecting volume after the connection to, or before the disconnection from, the primary volume can be advantageously exploited during the initial assembly or when changing the drying agent and can facilitate the handling considerably. Moreover, it can thus be ensured that only negligibly small quantities of the insulating fluid, if any, find their way into the environment. This is particularly advantageous with SF6 as the insulating fluid, since SF6 is a highly-potent greenhouse gas, which has a much greater climate-damaging effect than CO2.

If the secondary volume is cut off from the environment by a second cut-off valve, a secondary volume, which is assembled on the primary volume, for example, and whereof the drying agent is saturated with moisture or has a reduced effect, can be simply changed for a secondary volume which is provided with a new drying agent and has been pre-filled with the insulating fluid. Complex filling of the changed secondary volume is unnecessary here.

In the connection between the primary volume and the secondary volume, in embodiments of the high-voltage cable sealing end, a connecting volume can be realized which cannot be cut off from the surrounding atmosphere. However, since this volume is comparatively small in relation to the other system volumes, the quantity of ambient air in the system can be disregarded. However, it is essentially possible, via a line which is provided in some embodiments, to firstly at least partially evacuate volumes which have not been cut off before the cut-off valves are opened. Of course, the addition of insulating fluid can also take place, possibly after the evacuation.

A method for assembling a high-voltage cable sealing end according to the configurations mentioned above comprises providing a primary volume and a secondary volume, in which a drying agent is arranged or into which a drying agent is introduced. The two volumes are then connected to one another in a fluid-tight manner and the first cut-off valve is opened.

If the primary volume, but not the secondary volume, is already filled with the insulating fluid, insulating fluid can flow from the primary volume into the secondary volume after the first cut-off valve is opened. The ambient air in the secondary volume mixes with the insulating fluid, which can be unproblematic with a very small secondary volume compared to the primary volume.

If the secondary volume is already filled with the insulating fluid, the quantity of ambient air which finds its way into the system during assembly is still further reduced.

In embodiments of the high-voltage cable sealing end in which the secondary volume can be closed via a second cut-off valve, insulating fluid cannot escape from the secondary volume if the second cut-off valve is closed when the secondary volume is handled during assembly, and ambient air cannot find its way inside. In these embodiments, the assembly method moreover comprises opening the second cut-off valve after the fluid-tight connection.

In embodiments of the high-voltage cable sealing end in which a line which can be cut off in a fluid-tight manner is provided in the connection between the primary volume and the secondary volume, further method steps are possible depending on the embodiment of the high-voltage cable sealing end.

If the primary volume and/or the secondary volume are not filled with the insulating fluid after the fluid-tight connection, the insulating fluid can be introduced into the volumes of the system which are not filled with the insulating fluid via the line in the connection which can be cut off in a fluid-tight manner. In addition, the volumes of the system which are not filled with the insulating fluid can be at least partially evacuated beforehand. A similar situation applies if only an unavoidable, small connecting volume between the two cut-off valves is not filled with the insulating fluid. In these cases, the method comprises the additional steps of opening the line, filling the volumes not filled with the insulating fluid and closing the line.

Accordingly, a method for changing a secondary volume or a drying agent, incorporated therein, of a high-voltage cable sealing end according to the above-mentioned configurations comprises closing the first cut-off valve, followed by disconnecting the secondary volume from the primary volume. The drying agent in the secondary volume can then be changed, or a replacement secondary volume is provided with the drying agent incorporated therein. The secondary volume with the changed drying agent or the replacement secondary volume is then connected to the primary volume in a fluid-tight manner and the first cut-off valve is opened.

The additional method steps for the situation in which the secondary volume can be closed via a second cut-off valve correspond to those for the assembly and are not repeated at this point. The same applies in the event that a line which can be cut off in a fluid-tight manner is provided in the connection.

BRIEF DESCRIPTION OF THE DRAWING

By way of example, the invention is explained in more detail below with the aid of an embodiment and with reference to the accompanying figures. All figures are purely schematic and are not drawn to scale. In the drawing.

The same or similar elements are denoted by the same or similar reference signs in the figures.

EXEMPLARY EMBODIMENT

Figure 1:
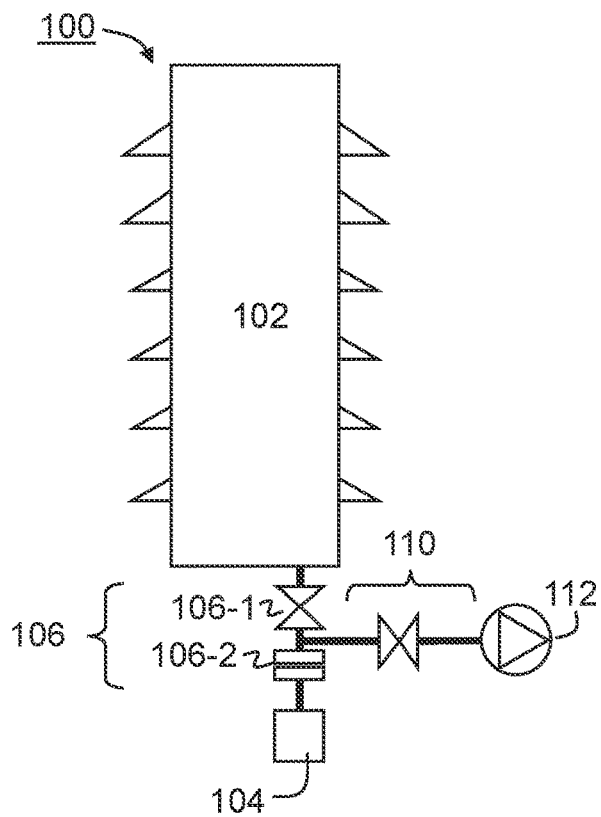
FIG. 1 shows a schematic illustration of a first embodiment of an inventive high-voltage cable sealing end.

FIG. 1 shows a schematic illustration of a first embodiment of an inventive high-voltage cable sealing end 100. A secondary volume 104 is connected to a primary volume 102 via a separable connection 106 which can be cut off in a fluid-tight manner, which primary volume is illustrated by the rectangle having the stylized ribs for extending the creepage distance. In this exemplary embodiment, the separable connection 106 comprises a first cut-off valve 106-1 and a disconnection point 106-2. The first cut-off valve 106-1 cuts off the primary volume 102 with respect to the disconnection point 106-2.

A line 110, which can be cut off in a fluid-tight manner and is provided in one or more embodiments of the inventive high-voltage cable sealing end, is moreover illustrated in FIG. 1, represented by a cut-off valve in the figure. A pump 112, for example, can be attached to the line which can be cut off in a fluid-tight manner, by means of which pump the secondary volume 104 and possibly the primary volume 102 and a connecting volume formed in the connection can be evacuated and/or filled with an insulating fluid.

Figure 2:
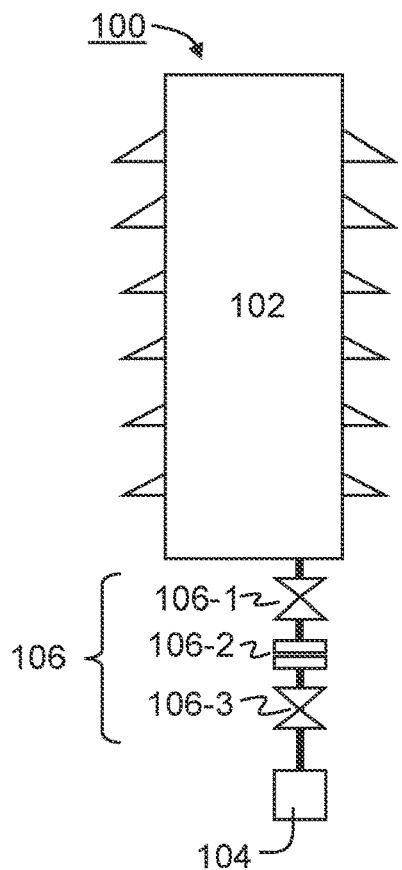
FIG. 2 shows a schematic illustration of a second embodiment of an inventive high-voltage cable sealing end.

FIG. 2 shows a schematic illustration of a second embodiment of an inventive high-voltage cable sealing end 100. As with the high-voltage cable sealing end described with reference to FIG. 1, a primary volume 102 and a secondary volume 104 are connected via a separable connection 106 which can be cut off in a fluid-tight manner. In contrast to the high-voltage cable sealing end described above, a second cut-off valve 106-3, which cuts off the secondary volume 104 with respect to the disconnection point, is provided in the separable connection 106 which can be cut off in a fluid-tight manner. In this embodiment, for example, as described above, the secondary volume can be changed without needing to remove the insulating fluid beforehand or add it after the assembly.

An embodiment (not shown) which is related to the embodiment shown in FIG. 2 comprises a line 110 which can be cut off in a fluid-tight manner and a second cut-off valve 106-2, thereby providing further handling options during assembly and when changing the drying agent.

Figure 3:
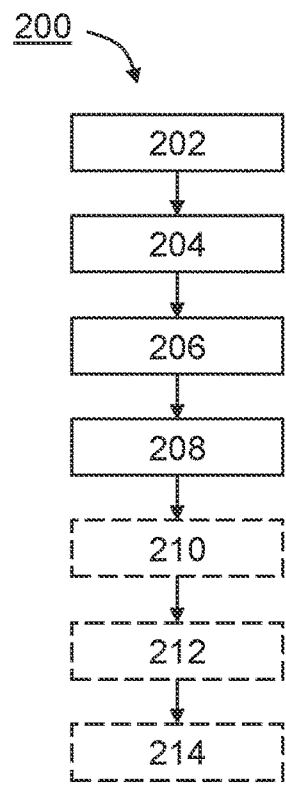
FIG. 3 shows a flow chart of an exemplary method for assembling an inventive high-voltage cable sealing end.

FIG. 3 shows a flow chart of an exemplary method 200 for assembling an inventive high-voltage cable sealing end 100. A primary volume 102 is provided in step 202 and a secondary volume 104 is provided in step 204, in which volumes a drying agent is arranged. The primary and secondary volumes 102, 104 are connected to one another in a fluid-tight manner in step 206, and the first cut-off valve 106-1 is opened in step 208.

In a variant of the method 200, which can be used, for example, when, in addition to the first cut-off valve 106-1 for the primary volume 102, a second cut-off valve 106-3 is provided at the secondary volume 104, the method can moreover comprise the step 210 in which the second cut-off valve 106-3 is opened. Step 210 takes place after the fluid-tight connection in step 206 and can be implemented before or after step 208.

In a further variant of the method 200, which can be used, for example, when a line 110 which can be cut off in a fluid-tight manner is provided in the connection 106 between the primary volume 102 and the secondary volume 104, the method can moreover comprise the steps 210, 212 and 214. The line 110 is opened in step 210, which is implemented after the fluid-tight connection in step 206. Then, in step 212, a connecting volume formed in the connection 106 and/or the secondary volume 104 is filled with the insulating fluid via the opened line 110. Finally, the line 110 is closed again in step 212. The sequence of the additional steps in this variant in the event that a second cut-off valve 106-3 is provided in the connection 106 is obvious to a person skilled in the art.

Figure 4:
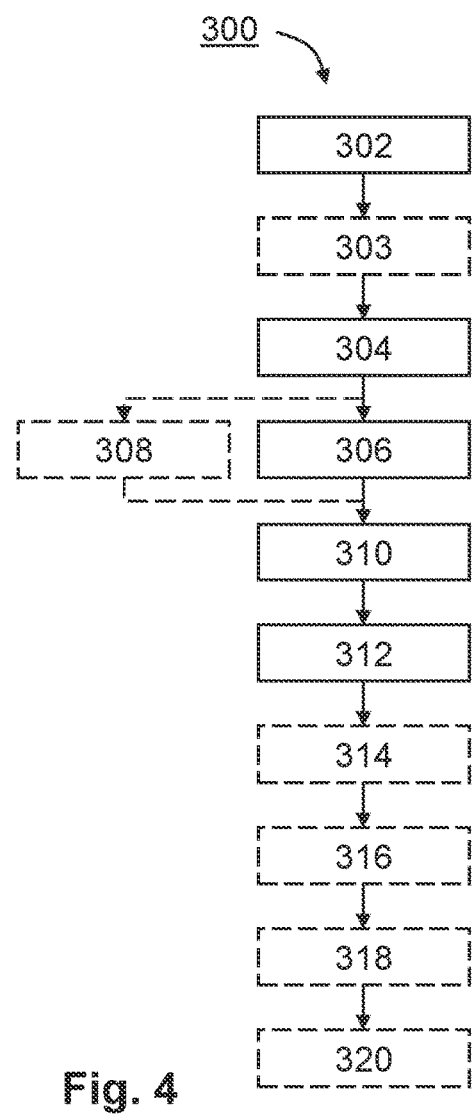
FIG. 4 shows a flow chart of an exemplary method for changing a secondary volume, or a drying agent incorporated therein, of an inventive high-voltage cable sealing end.

FIG. 4 shows a flow chart of an exemplary method 300 for changing a secondary volume 104 or a drying agent, incorporated therein, of an inventive high-voltage cable sealing end 100. Starting with a system in which a primary volume 102 is connected to a secondary volume 104 via a fluid-tight connection 106, the method firstly comprises the step 302, in which the first cut-off valve 106-1 is closed. Only then is the secondary volume 104 disconnected from the primary volume 102 in step 304 and the drying agent in the now disconnected secondary volume 104 changed in step 306. Alternatively, a replacement secondary volume 104 can be provided in step 308. The secondary volume 104 is then connected to the primary volume 102 again in a fluid-tight manner in step 310 and the first cut-off valve 106-1 is opened in step 312.

In a variant of the method 300, which can be used, for example, if, in addition to the first cut-off valve 106-1 for the primary volume 102, a second cut-off valve 106-3 is provided at the secondary volume 104, the method can moreover comprise the step 303, in which the second cut-off valve 106-3 is closed. Step 303 takes place before the disconnection in step 304 and can be implemented before of after step 302. This variant moreover comprises the step 314, in which the second cut-off valve 106-3 is opened. Step 314 takes place after the fluid-tight connection in step 310 and can be implemented before or after step 312.

In a further variant of the method 300, which can be used, for example, when a line 110 which can be cut off in a fluid-tight manner is provided in the connection 106 between the primary volume 102 and the secondary volume 104, the method can moreover comprise the steps 316, 318 and 320. In step 316, which is implemented after the fluid-tight connection in step 310, the line 110 is opened. Then, in step 318, a connecting volume formed in the connection 106 and/or the secondary volume 104 is filled with the insulating fluid via the opened line 110. Finally, the line 110 is closed again in step 320. The sequence of the actual steps in this variant in the event that a second cut-off valve 106-3 is provided in the connection 106 is obvious to a person skilled in the art.

LIST OF REFERENCE SIGNS

100 High-voltage cable
sealing end
102 Primary volume
104 Secondary volume
106 Separable connection
106-1 First cut-off valve
106-2 Disconnection point
106-3 Second cut-off valve
110 Line
112 Pump
200 Assembly method
202-214 Method steps
300 Changing procedure
302-31 Method steps

The invention claimed is:

1. A high-voltage cable sealing end comprising:
   a primary volume; and
   a secondary volume fluidically connected thereto, which are filled with an insulating fluid,
   wherein the primary volume and the secondary volume are sealed with respect to the atmosphere surrounding the high-voltage cable sealing end, in that the secondary volume can be disconnected from the primary volume via a separable connection which can be cut off in a fluid-tight manner, and in that a drying agent is introduced into the secondary volume.

2. The high-voltage cable sealing end according to claim 1, wherein the separable connection which can be cut off in a fluid-tight manner comprises a first cut-off valve for the primary volume and a disconnection point for the secondary volume.

3. The high-voltage cable sealing end according to claim 2, wherein the separable connection which can be cut off in a fluid-tight manner comprises a second cut-off valve between the disconnection point and the secondary volume.

4. The high-voltage cable sealing end according to claim 1, wherein a connecting volume is formed outside the first cut-off valve in the connection between the primary volume and the secondary volume, and wherein a line which can be cut off in a fluid-tight manner is provided in the connection, which line is designed for evacuating or filling at least the connecting volume.

5. A method for assembling a high-voltage cable sealing end according to claim 1, comprising:
   providing a primary volume,
   providing a secondary volume, in which a drying agent is arranged or incorporated,
   connecting the secondary volume to the primary volume in a fluid-tight manner, and
   opening the first cut-off valve.

6. The method according to claim 5, further comprising, when a second cut-off valve is provided at the secondary volume:
   opening the second cut-off valve after the fluid-tight connection of the secondary volume to the primary volume.

7. The method according to claim 5, after the fluid-tight connection of the secondary volume to the primary volume, further comprising, when a line which can be cut off in a fluid-tight manner is provided in the connection between the primary volume and secondary volume:
   providing the line,
   filling a connecting volume formed in the connection and/or the secondary volume with the insulating fluid, and
   closing the line.

8. The method for changing a secondary volume or a drying agent, incorporated therein, of a high-voltage cable sealing end according to claim 1, comprising the steps of:
   closing the first cut-off valve,
   disconnecting the secondary volume from the primary volume,
   changing the drying agent in the disconnected secondary volume or providing a replacement secondary volume with a drying agent incorporated therein,
   connecting the secondary volume to the primary volume in a fluid-tight manner, and
   opening the first cut-off valve.

9. The method according to claim 8, further comprising, when a second cut-off valve is provided at the secondary volume:
   closing the second cut-off valve before disconnecting the secondary volume from the primary volume, and
   opening the second cut-off valve after the fluid-tight connection of the secondary volume to the primary volume.

10. The method according to claim 8, after the fluid-tight connection of the secondary volume to the primary volume, moreover comprising, when a line which can be cut off in a fluid-tight manner is provided in the connection between the primary volume and the secondary volume:
    opening the line,
    filling the connecting volume and/or the secondary volume with the insulating fluid, and
    closing the line.

* * * * *